July 1, 1958   A. NEGROMANTI   2,841,681
ELECTRO-THERMAL REGULATING DEVICE
Filed May 31, 1955

Inventor
A. Negromanti
By [signature]
Attys.

United States Patent Office 2,841,681
Patented July 1, 1958

2,841,681

ELECTRO-THERMAL REGULATING DEVICE

Antonio Negromanti, Milan, Italy

Application May 31, 1955, Serial No. 512,094

Claims priority, application Great Britain June 3, 1954

4 Claims. (Cl. 219—20)

This invention relates to an electro-thermal device for regulating at will, and from a distance, the temperature of an electrically heated body, without having recourse to the usual thermostatic valves or like voluminous devices placed in close contact with the heated body.

A preferred form of construction of the invention is diagrammatically illustrated merely by way of example by the accompanying drawings, wherein by way of example the body of which the temperature is to be regulated and controlled is the work-plate of an ordinary smoothing or pressing iron.

Figure 1:
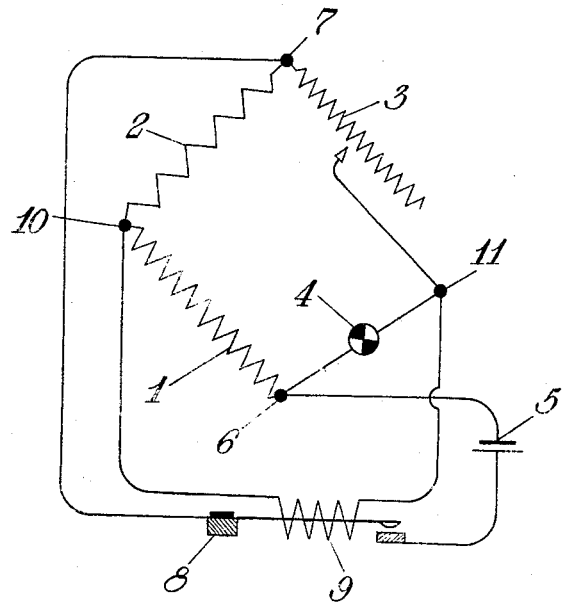

In these drawings, Figure 1 is a circuit diagram of the device; and

Figure 2:
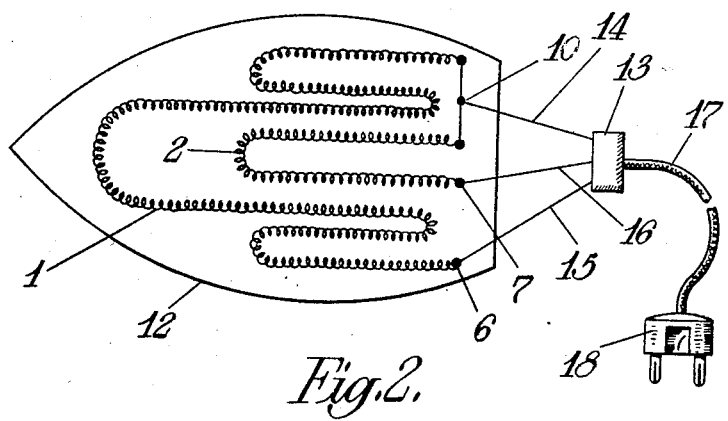

Figure 2 is a plan view of the work-plate of a smoothing iron thermally regulated according to the present invention.

It will be assumed that the heating circuit 1 has a temperature coefficient of zero and a resistance of 100 ohms; 2 denotes a circuit having a variable temperature coefficient, preferably positive, and a resistance of 5 ohms; 3 denotes a circuit the resistance of which can be varied by means of a sliding contact, which will be assumed to be placed in such a position that the circuit has a resistance of 150 ohms; and 4 is a circuit having a resistance of 3000 ohms and a zero temperature coefficient. The circuit 4 is by way of example represented as an incandescent lamp.

These circuits, connected as indicated in Figure 1, constitute the four arms of a Wheatstone bridge which is perfectly balanced when the heating circuit is cold. It will be obvious that the ohmic values assigned to the four circuits may differ from those enumerated, provided they satisfy the above condition. Now let it be assumed that the opposite angles 6 and 7 of the bridge are supplied with current from a source 5, through an electro-thermal or electro-magnetic relay 8, the excitation circuit 9 of which is inserted between the other two opposite angles 10 and 11 of the bridge.

The body of which it is desired to control and regulate the temperature at will is assumed to be, for instance the work-plate 12 of a 400-watt smoothing iron supplied at a voltage of 200, and the circuits 1 and 2 will be arranged on this plate, preferably in the manner indicated in Figure 2.

In a separate casing 13 are arranged the circuits 3 and 4 and the relay 8, and by means of conductors 14, 15 and 16 these are connected with the circuits 1 and 2 in the manner indicated in Figure 1. By 17 is denoted a current-supply cable leading to a current plug 18.

The method of operation of the device will now be readily understood. The circuit 2, which may be described as the control circuit, will not become heated by Joule effect, in view of the smallness of its ohmic resistance, but it will be heated by the plate 12, with which it is in close contact, and will assume the temperature of the plate. To any increase in this temperature there will correspond an increase in the ohmic resistance of the circuit 2, until it reaches a value for which there will be a sufficient voltage difference between the angles 10 and 11 to give rise to a current strong enough to energise the relay 8, with consequent interruption of the heating current.

The possibility is provided of varying the period of interruption of the relay 8, so as to have practically constant temperatures on the plate 12. By varying the sensitiveness of the relay 8, for instance by inserting in its excitation circuit 9 a variable auxiliary resistance, the value of the energisation current will also be varied, and therefore also the temperature that will be maintained on the plate. This temperature can be read off on an appropriate dial.

A similar result may be obtained by keeping the sensitiveness of the relay 8 constant and varying the ratio between the arms of the bridge by means of the above-mentioned slidable contact on the resistance arm 3.

I claim:

1. An electro-thermal device for regulating the temperature of an electrically heated body, comprising four circuits forming together the four arms of a Wheatstone bridge, one arm of the bridge alone constituting the heating circuit that heats the said body, and having a zero temperature coefficient, and one arm adjacent thereto constituting alone a control circuit, this arm having a variable temperature coefficient and a negligible ohmic resistance, and this control circuit as well as the heating circuit being in close contact with the body the temperature of which is to be controlled, an electrical relay, and means for supplying electric current through the said electrical relay to two opposite angles of the Wheatstone bridge, said two arms being connected in series across the means for supplying electric current, the other two arms of the bridge being connected in series across said means, remote from and out of heat exchange relation with said body, the excitation circuit of the said relay being inserted directly between the remaining two opposite angles of the Wheatstone bridge, and being adapted to open the heating circuit upon a predetermined temperature of the body that is being heated being exceeded.

2. An electro-thermal regulating device as claimed in claim 1, further comprising a sliding contact for varying the resistance of that arm of the Wheatstone bridge which is opposite to the heating resistance.

3. An electro-thermal regulating device as claimed in claim 1, the arm of the Wheatstone bridge opposite to the control circuit having a zero thermal coefficient and an ohmic resistance which is substantially greater than that of any other arm of the bridge.

4. An electro-thermal regulating device as claimed in claim 1, said other two arms of the Wheatstone bridge being arranged in a separate casing.

References Cited in the file of this patent

UNITED STATES PATENTS

| 1,276,589 | Steinmetz | Aug. 20, 1918 |
| 1,994,076 | Kuhle et al. | Mar. 12, 1935 |
| 2,093,745 | Westell | Sept. 21, 1937 |
| 2,163,297 | Waage | June 20, 1939 |
| 2,278,633 | Bagnall | Apr. 7, 1942 |
| 2,510,039 | Rudahl | May 30, 1950 |
| 2,673,917 | Woodling | Mar. 30, 1954 |
| 2,732,477 | Runaldue et al. | Jan. 24, 1956 |

FOREIGN PATENTS

| 144,669 | Great Britain | Sept. 9, 1921 |
| 338,880 | Great Britain | Nov. 18, 1930 |